Oct. 27, 1970  G. KNETSCH  3,536,379
THREE LENS OBJECTIVE WITH GOOD CORRECTION OF THE SECONDARY SPECTRUM
Filed April 18, 1967  2 Sheets-Sheet 1

INVENTOR
Georg Knetsch

ATTORNEY

3,536,379
THREE LENS OBJECTIVE WITH GOOD CORRECTION OF THE SECONDARY SPECTRUM

Georg Knetsch, Berghausen, Kreis Wetzlar, Germany, assignor to Firma Ernst Leitz GmbH, Wetzlar, Germany
Filed Apr. 18, 1967, Ser. No. 631,786
Claims priority, application Germany, Apr. 22, 1966, L 53,417
Int. Cl. G02b 1/00, 11/06
U.S. Cl. 350—177                                    1 Claim

ABSTRACT OF THE DISCLOSURE

An objective lens is provided having a convergent lens between two divergent lenses, the convergent lens being made of glass having an anomalous partial dispersion. The three lenses are cemented together and provide an objective assembly that exhibits good correction of the primary and secondary spectra, while allowing use of small $f$-number and large focal length at small spherical aberration.

RELATED APPLICATION

The convergent lens is of a glass type as described in patent application Ser. No. 603,978, filed Dec. 22, 1966.

FIELD OF THE INVENTION

The present invention relates to objective lenses having three components, a convergent lens between two divergent lenses, and having improved chromatic and spherical aberrations.

THE PRIOR ART

Numerous three-lens, apochromatic objectives are known in which at least one lens is made of a glass of an anomalous partial dispersion. The rules governing apochromatic correction have long been known and have been published repeatedly in the literature, and also in patents. The known objectives, however, have essentially only a small aperture in the region of $f:12.5$ to $f:9$. Although a three-lens, cemented apochromatic objective permitting an aperture larger than $f:9$ is known, the surfaces of this objective have a very strong curvature. This results in increased spherical aberration. All known objectives, however, have in common that they are composed of two convergent lenses and one divergent lens, the convergent lenses encompassing, in most cases, the divergent lens.

A disadvantage in all known systems is that they are suitable only for relatively short focal lengths, since particularly the sphero-chromatic aberrations are too disturbing, if relatively long focal lengths are provided.

The prior art is represented by U.S. Pats. No. 2,487,873, issued Nov. 15, 1949, to Herzberger et al., class 350–177, and No. 2,689,555, issued Jan. 4, 1955, to McCerthy, class 123–90.

SUMMARY OF THE INVENTION

In view of the prior art, objects of the present invention are: to provide a lens having good correction of the primary and secondary spectra, while allowing the use of small $f$-number and large focal length at small spherical aberration. In the interest of clarity in view of the prior art, "small $f$-number," as used herein, is used in the sense that $f:5.9$ is smaller than $f:12.5$.

In the invention, a convergent lens made of glass of anomalous partial dispersion is enclosed by two divergent lenses. It has been found that a lens made according to these specifications has small aberration and is thus remarkably well suited for achieving the objects of the invention. In this form of the invention, the parameters of the combination are calculated such that the primary and the secondary spectra are minimized. The theory of color correction calculations is known in the art. For instance, it is acceptable to choose the lens parameters such that the F', g, e and C' curves in the color correction chart of the three-component lens of the invention all lie within the limits of $$\frac{\Delta S'}{\lim_{R \to 0} (S_e')} = \pm .0004$$

up to a radial distance from the optical axis corresponding to $f/5.9$.

In another advantageous form of the invention, the divergent lenses are negative menisci. These are cemented on the two faces of the convergent lens. In a three-component lens of this type, correction of the primary spectrum is attained by making $$\Delta \Phi = \frac{\phi_1}{v_{e1}} + \frac{\phi_2}{v_{e2}} + \frac{\phi_3}{v_{e3}}$$

small. Here, $$v_e = \frac{n_e - 1}{n_{F'} - n_{C'}} = \text{the Abbe value for a component}$$

$\phi =$ the refractive power of a component $=$ the reciprocal of the focal length of the component, $\Delta \Phi =$ the difference between the lens refractive power for the F' Fraunhofer wavelength and the lens refractive power for the C' Fraunhofer wavelength; the numerical subscripts index the components. Correction of the secondary spectrum is attained by making $$\Delta \Phi = \vartheta_1' = \frac{\phi_1}{v_{e1}} + \vartheta_2' \frac{\phi_2}{v_{e2}} + \vartheta_3' \frac{\phi_3}{v_{e3}}$$

small. Here, $$\vartheta' = \frac{n_g - n_{F'}}{n_{F'} - n_{C'}} = \text{the partial dispersion for a component}$$

and $\Delta' \Phi =$ the difference between the lens refractive power for the $g$ Fraunhofer wavelength and the lens refractive power for the F' Fraunhofer wavelength. It has been found when $\Delta \Phi$ and $\Delta' \Phi$ are made small in this advantageous, cemented form of the invention, the lens gives a sharp picture at small $f$-number and large focal length. Values of $\Delta \Phi / \Phi$ and $\Delta' \Phi / \Phi$ less than .0008 are acceptable, while values less than .0004 are preferred.

It is evident that it is not possible to make both $\Delta \Phi$ and $\Delta' \Phi$ small, if $v_e$ and $\vartheta'$ are linearly related. Common optical glasses are related in such a manner and lie on straight lines in $v - \vartheta'$ diagrams. Such lines are shown in U.S. Pat. No. 2,996,390 of Aug. 15, 1961, of Weissberg, for "Optical Glass With Anomalous Partial Dispersion," and in FIG. 3 of the drawing herein. A glass having an anomalous partial dispersion is one that lies displaced from such a line in a $\vartheta' - v$ diagram. In one advantageous form of the invention, the glass of anomalous partial dispersion used for the convergent lens is of the type described in the U.S. patent application Ser. No. 603,978, filed Dec. 22, 1966. The applicant discovered that such glasses yield superior correction of secondary spectrum as part of the present invention. The glasses described therein have indices of refraction in the range of 1.53 to 1.55 for $v_e$-values of about 60 to 75. The anomalous partial dispersion of these glasses is characterized by $\Delta v_e$-values of about $+8$ to $+15$, where $\Delta v_e$ is the deviation at constant $\vartheta'$ from the normal straight line of the $\vartheta' - v$ diagram.

In another advantageous form of the invention, the indices of refraction of both divergent lenses are greater than the index of refraction of the convergent lens, so that the cemented surfaces have a diverging action. This relationship of indices of refraction and the diverging effect of the cemented surfaces make it possible to achieve an especially small *f*-number without an undue increase in the sphero-chromatic aberrations, particularly in the case of a lens of long focal length.

An especially successful execution of this last form of the invention is that in which the negative refractive powers are in the ratio of 1:2 in the direction of light. When this is the case, it is advantageous to make the difference in the refractive indices between the first divergent lens and the convergent lens larger than 0.06, while the difference of the indices of refraction between the convergent lens and the second divergent lens is to be at least 0.01. At these differences between the indices of refraction, the radii of curvature of the cemented surfaces can range between 0.2 times and 0.4 times the total focal length; this permits an economical manufacture of the objective, particularly in cases where the objective is to be constructed for a large focal length.

Other objects and many of the attendant advantages of this invention will be readily appreciated as the same becomes better understood by reference to the following detailed description when considered in connection with the accompanying drawings in which like reference numerals designate like parts throughout the figures thereof.

DESCRIPTION OF THE PREFERRED EMBODIMENT

Figure 1:
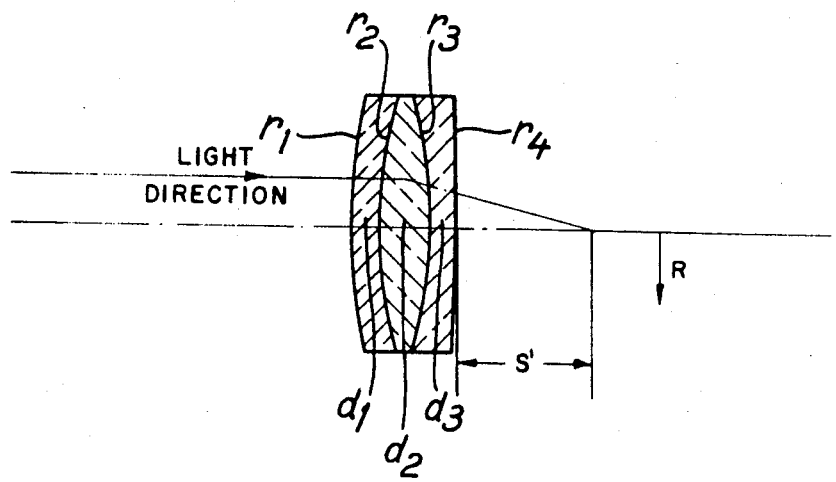
FIG. 1 is a cross-sectional view of an objective in accordance with the invention.

Shown in FIG. 1 is an objective lens in accordance with the present invention having a convergent lens between two divergent lenses. The three components have thicknesses measured along the optical axis, designated $d_1$, $d_2$, $d_3$, respectively; the four radii of curvature of the four refracting surfaces of this lens are designated $r_1$, $r_2$, $r_3$ and $r_4$, respectively.

Significantly, the glass of the convergent lens has an anomalous partial dispersion. It is apparent that the convergent lens is enclosed by the divergent lenses and, furthermore, that the divergent lenses are negative menisci cemented onto the surfaces of the convergent lens.

The table below gives the optical data for a preferred embodiment of the invention. This lens is constructed as shown in FIG. 1. The total refractive power of this lens is $\Phi = +0.9912$. It has an equivalent Abbe number $N = 3337$.

| $r$ | $d$ | $n_e$ | $v_e$ | $\vartheta'$ | $\phi$ |
|---|---|---|---|---|---|
| $r_1 = +0.51416$ | | | | | |
| | 0.012 | 1.67245 | 45.8 | 0.4980 | −0.7933 |
| $r_2 = +0.320041$ | | | | | |
| | 0.025 | 1.54408 | 73 | 0.4819 | +3.4001 |
| $r_3 = −0.320041$ | | | | | |
| | 0.012 | 1.57125 | 55.8 | 0.4866 | −1.6156 |
| $r_4 = −3.37378$ | | | | | |

In the above table, $r$ is the radius of curvature of the refracting surface, $d$ is the lens thickness along the optical axis, $n_e$ is the refractive index for the Fraunhofer line $e$, $v_e$ the dispersion value or Abbe number, $\vartheta'$ is the partial dispersion, and $\phi$ is the refractive power of the individual lenses.

Items to be noted in the table are the following: $n_e$ for the two negative lenses is greater than $n_e$ for the converging lens; the refractive power of the last lens in the direction of light is twice that of the first lens; the difference in the refractive indices between the first divergent lens in the direction of light and the convergent lens is larger than 0.06; the difference in the indices of refraction between the convergent lens and the second divergent lens is at least 0.01; and the radii of curvature of the cemented surfaces are between 0.2 and 0.4 times the focal length, which is approximately 1. The large value of N is an indication of the superior achromatic correction of the objective of the invention. The calculated $\Delta\Phi$ for the above table is .00030, while $\Delta'\Phi$ is .00027.

The glass for the first lens in the light direction is obtained from the following mixture of raw materials:

| | |
|---|---|
| $SiO_2$ | 24.5 |
| $B_2O_3$ | 10.8 |
| $Na_2O$ | 0.8 |
| $CaO$ | 14.4 |
| $BaO$ | 12.0 |
| $ZnO$ | 15.5 |
| $PbO$ | 10.5 |
| $Al_2O_3$ | 7.1 |
| $ZrO_2$ | 4.4 |

The glass for the convergent lens is obtained from the following mixture of raw materials:

| | |
|---|---|
| $Al(PO_3)_3$ | 27.9 |
| $Mg(PO_3)_2$ | 4.0 |
| $Ca(PO_3)_2$ | 3.2 |
| $MgO$ | 2.0 |
| $MgF_2$ | 6.9 |
| $CaF_2$ | 7.0 |
| $SrF_2$ | 23.8 |
| $BaF_2$ | 24.7 |
| $K_2TiF_6$ | 0.5 |

This glass falls under the related U.S. patent application noted above.

The third lens in the direction of light is made from a glass commercially available from the firm of Jenaer Glaswerk Schott & Gen., which designates it as type BaK4.

Figure 3:
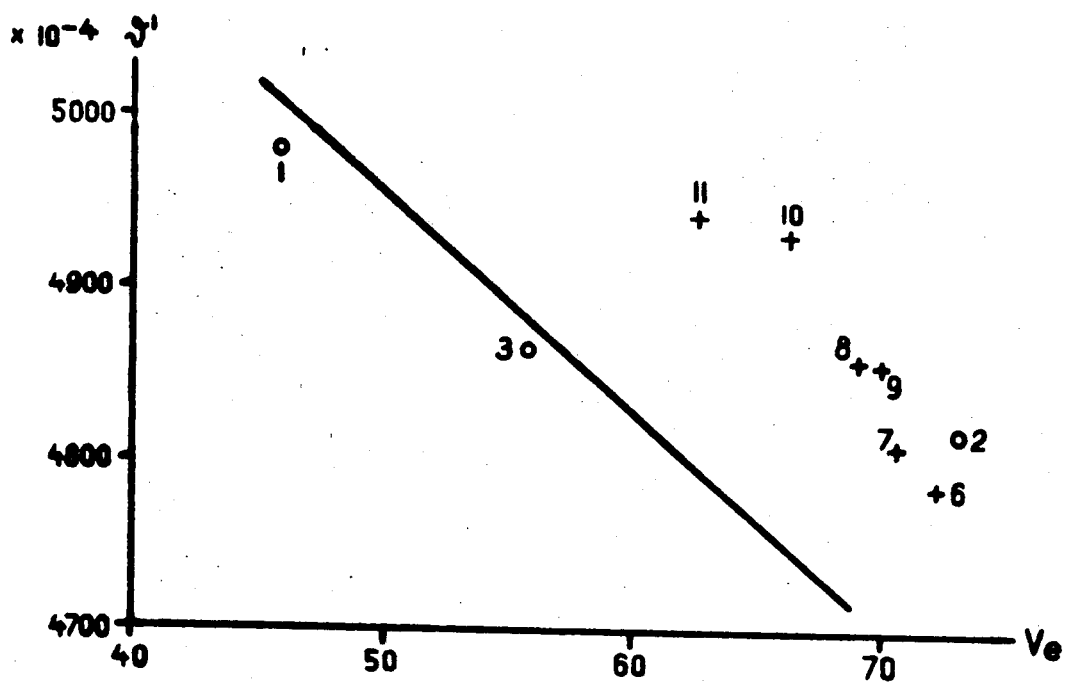
FIG. 3 is a $\vartheta$-$v$ diagram for the data of Table 2 of the related application noted above.

FIG. 3 is a $v$—$\vartheta$ plot of the data of Tables 2 and 4 of the above-noted, related patent application. The glasses of these tables are designated by their melt numbers. The three components of the lens of FIG. 1 are also included in the figure, where they are indexed in their order in the direction of light as components 1, 2 and 3. The anomalous partial dispersion of the glass of the convergent lens is characterized by a $\Delta ve$ of 11.8.

Figure 2:
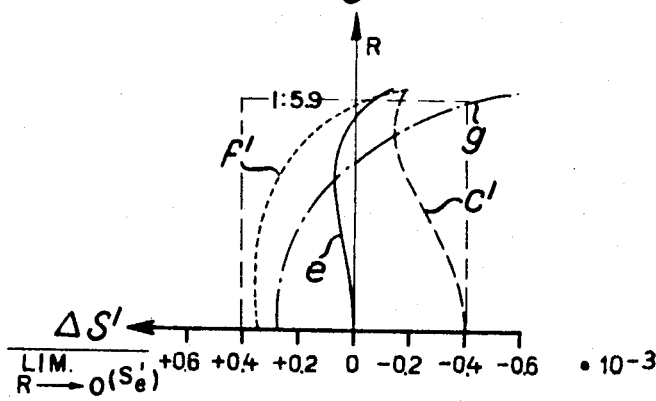
FIG. 2 is a color correction chart illustrating color correction curves for an objective in accordance with the invention.

In FIG. 2, correction curves for the color correction of an objective according to the invention are illustrated. The abscissa gives the relative deviational intersection distances $$\frac{S'}{\lim_{R \to 0}(S'_e)}$$

while the ordinate gives the radial distance R from the optical axis. Here, S' is the distance to the optical axis intersection of a light ray entering the objective parallel to its optical axis, as measured from the last lens surface of the objective. The symbol $S'_e$ is the S' distance for a light ray having a wavelength equal to that of the Fraunhofer $e$ line, while $$\lim_{R \to 0}(S'_e)$$

indicates the $S'_e$ for rays in the immediate vicinity of the optical axis. Since correction is calculated primarily for the Fraunhofer $e$ line, the $$\lim_{R \to 0}(S'_e)$$

distance is chosen as the standard distance and $\Delta S'$ values are determined by taking the difference $$S' - \left[\lim_{R \to 0} S'_e\right]$$

The distances R are given in terms of relative aperture. The point for $f/5.9$ is indicated in the graph. Observation of the graph shows that each Fraunhofer wavelength results in a separate curve. Referral to the graph of FIG. 2 yields the relative deviational distances of the Fraunhofer lines that enter parallel to the optical axis in the immediate vicinity thereof. These distances are obtained from the intersections of the various curves with the abscissa, where R=0. For example, the distance for the wavelength F' is seen to be about $0.33 \times 10^{-3}$ times the analogous intersection distance for the line $e$. If the distance for the line $e$ is designated to be 1, then the absolute deviation is thus about $3/10,000$. The deviation for an identical ray of the Fraunhofer line C' may be seen to amount along the axis, to $-0.4 \cdot 10^{-3}$, or $-4/10,000$. These distances give a measure of the chromatic aberration.

These data are valid for those rays which enter the objective, as mentioned above, in parallel to the optical axis and in the immediate vicinity of this axis. For rays which likewise enter the objective parallel to the optical axis, but at a larger distance therefrom, different values apply because of the spherical nature of the refractive surfaces of the individual lenses. As a measurement value for the distance R, the relative aperture is selected. The relative aperture of 5.9 is indicated for the objective. At this relative aperture, the focal length is 5.9 times as large as the distance separating two rays, parallel to the optical axis and diametrically opposite to each other, which rays just barely pass through the objective. For such a ray, it is valid that the radial distance from the axis to the optical rim of an objective with a focal length of 1.0, equals $$\frac{1}{2 \times 5.9}$$

In an objective of the type disclosed, the intersection distance S' can be practically equated with the focal length of the objective. If such an objective has a focal length of 800 mm., as provided for a practical embodiment, then the points of intersection for all rays of all colors impinging in parallel to the optical axis are within the range of $\pm 0.4 \cdot 10^{-3} \cdot 800$ mm. These values are deviations from the focal point which amount to at most 0.32 mm. From this result, it can be easily calculated that the so-called circles of confusion resulting from these deviations are extraordinarily small. Therefore, the entire objective exhibits an excellent color correction.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

I claim:
1. In an objective having three contacting lenses, the objective having parameters for giving good correction of the primary and secondary spectra and comprising a convergent lens made of glass of anamalous partial dispersion and two divergent lenses encompassing said convergent lens, the objective being characterized by the following data:

$\Phi$: 0.9912
N: 3337
focal length: 1.0
relative aperture: 5.9

| $r$ | $d$ | $n_e$ | $v_e$ | $v'$ | $\phi$ |
|---|---|---|---|---|---|
| $r_1 = +0.51416$ | | | | | |
| | 0.012 | 1.67245 | 45.8 | 0.4980 | $-0.7933$ |
| $r_2 = +0.320041$ | | | | | |
| | 0.025 | 1.54408 | 73 | 0.4819 | $+3.4001$ |
| $r_3 = -0.320041$ | | | | | |
| | 0.012 | 1.57125 | 55.8 | 0.4866 | $-1.6156$ |
| $r_4 = -3.37378$ | | | | | | wherein $r$ is the radius of curvature of the refracting surface, $d$ is the lens thickness along the optical axis, $n_e$ is the refractive index for the Fraunhofer line $e$, $v_e$ the dispersion value or Abbe number, $v'$ is the partial dispersion, $\phi$ is the refractive power of the individual lenses, $\Phi$ is the total refractive power of the objective, and N is the equivalent Abbe number of the entire objective.

References Cited

UNITED STATES PATENTS

| 1,293,086 | 2/1919 | Graf | 350—234 |
| 2,363,770 | 11/1944 | Bennett | 350—177 |
| 2,544,901 | 3/1951 | Shade | 350—222 |
| 3,209,649 | 10/1965 | Macher | 350—234 X |
| 3,298,772 | 1/1967 | Milinowski | 350—234 |

OTHER REFERENCES

C. H. Cartwright, "Lithium . . . Apochromat," JOSA, vol. 29, August 1939, pp. 350–351, 350/234.

DAVID SCHONBERG, Primary Examiner

P. A. SACHER, Assistant Examiner

U.S. Cl. X.R.

350—234